(12) United States Patent
Guerber et al.

(10) Patent No.: US 10,705,294 B2
(45) Date of Patent: Jul. 7, 2020

(54) WAVEGUIDE TERMINATION DEVICE

(71) Applicant: STMicroelectronics (Crolles 2) SAS, Crolles (FR)

(72) Inventors: Sylvain Guerber, Isere (FR); Charles Baudot, Lumbin (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 0 days.

(21) Appl. No.: 16/295,553

(22) Filed: Mar. 7, 2019

(65) Prior Publication Data
US 2019/0285802 A1  Sep. 19, 2019

(30) Foreign Application Priority Data
Mar. 15, 2018 (FR) ..................... 18 52247

(51) Int. Cl.
*G02B 6/24* (2006.01)
*G02B 6/122* (2006.01)
(Continued)

(52) U.S. Cl.
CPC ............ *G02B 6/243* (2013.01); *G02B 6/122* (2013.01); *G02B 6/1228* (2013.01); *G02B 6/4219* (2013.01); *G02B 2006/12147* (2013.01)

(58) Field of Classification Search
None
See application file for complete search history.

(56) References Cited

U.S. PATENT DOCUMENTS

| 5,065,123 A | 11/1991 | Heckaman et al. |
| 2003/0068152 A1* | 4/2003 | Gunn, III ............... B82Y 20/00 385/129 |

(Continued)

FOREIGN PATENT DOCUMENTS

| EP | 1777775 A1 | 4/2007 |
| EP | 3252866 A1 | 12/2017 |

(Continued)

OTHER PUBLICATIONS

Yongle Wu et al: "Dual-Band Dual-Mode Substrate Integrated Waveguide Filters with Independently Reconfigurable TE101 resonant Mode", Scientific Reports, vol. 6, No. 1, Aug. 26, 2016 (Aug. 26, 2016), XP055399843, DOI: 10.1038/srep31922 *abrégé* * figure 1*.

(Continued)

*Primary Examiner* — Jerry Rahll
(74) *Attorney, Agent, or Firm* — Crowe & Dunlevy

(57) ABSTRACT

An optical waveguide termination device includes a waveguide and metal vias surrounding an end portion of the waveguide. The end portion of the waveguide has a transverse cross-sectional area that decreases towards its distal end. The metal vias are orthogonal to a same plane, with the same plane being orthogonal to the transverse cross-section. The metal vias absorb light originating from the end portion when a light signal propagates through the waveguide, and the metal vias and the end portion provide that an effective index of an optical mode to be propagated through the waveguide progressively varies in the end portion. Additional metal vias may be present along the waveguide upstream of the end portion, with the additional metal vias bordering the waveguide upstream of the end portion providing that the effective index of an optical mode to be propagated through the waveguide varies progressively toward the end portion.

25 Claims, 2 Drawing Sheets

(51) Int. Cl.
    *G02B 6/12*    (2006.01)
    *G02B 6/42*    (2006.01)

(56) References Cited

U.S. PATENT DOCUMENTS

| | | |
|---|---|---|
| 2011/0181373 A1 | 7/2011 | Kildal |
| 2014/0029892 A1 | 1/2014 | Pomerene et al. |
| 2014/0286606 A1 | 9/2014 | Takahashi |
| 2015/0270414 A1 | 9/2015 | Pomerene et al. |
| 2017/0090118 A1 | 3/2017 | Sodagar et al. |

FOREIGN PATENT DOCUMENTS

| | | |
|---|---|---|
| JP | H06300933 A | 10/1994 |
| JP | H1172633 A | 3/1999 |
| WO | 2010003808 A2 | 1/2010 |

OTHER PUBLICATIONS

INPI Search Report and Written Opinion for FR 1852247 dated Feb. 11, 2018 (11 pages).

Huang Yong Mao et al: "Small-reflected substrate integrated waveguide termination with multi-step shape and absorbing material", 2017 IEEE International Symposium on Antennas and Propagation & USNC/URSI National Radio Science Meeting, IEEE, Jul. 9, 2017 (Jul. 9, 2017), pp. 2605-2606, XP033230543, DOI: 10.1109/APUSNCURSINRSM.2017.8073345 [extrait le Oct. 18, 2017] *abrégé* *figure 2*.

First Office Action and Search Report for co-pending CN Appl. No. 201910194649.4 dated Mar. 19, 2020 (6 pages) (English translation not available).

* cited by examiner

WAVEGUIDE TERMINATION DEVICE

PRIORITY CLAIM

This application claims the priority benefit of French Application for Patent No. 1852247, filed on Mar. 15, 2018, the content of which is hereby incorporated by reference in its entirety to the maximum extent allowable by law.

TECHNICAL FIELD

The present disclosure relates to the field of waveguides, and more particularly to waveguides of integrated photonic (optical and/or optoelectronic) circuits.

BACKGROUND

In an integrated photonic circuit, a light signal may be transmitted by a waveguide. When an end of the waveguide emerges into the material having the waveguide embedded therein, a waveguide termination device is generally provided. A waveguide termination device enables to at least partially absorb the power of the signal, to limit or even to suppress the transmission of part of this power to components of the integrated circuit, such a power transmission being capable of disturbing the circuit operation. Such a device also enables to limit, or even to suppress, the reflection of part of the power of the signal at the level of the end of the waveguide, such a power reflection also being capable of disturbing the operation of the integrated circuit.

It would be desirable to have a waveguide termination device which overcomes at least some disadvantages of known waveguide terminal devices. In particular, it would be desirable to have a waveguide terminal device for a waveguide formed in an insulating layer of an interconnection structure of an integrated photonic circuit.

SUMMARY

In an embodiment, a device including a waveguide and metal vias surrounding an end portion of the waveguide.

According to an embodiment, the end portion has a transverse cross-section area which decreases toward its distal end.

According to an embodiment, the vias are orthogonal to a same plane, the plane being orthogonal to the transverse cross-section.

According to an embodiment, the vias are configured to absorb light originating from the end portion when a light signal propagates through the waveguide.

According to an embodiment, the vias and the end portion are configured so that the effective index of an optical mode to be propagated through the waveguide varies progressively in the end portion.

According to an embodiment, in a plane orthogonal to the vias, the distance between the vias and the end portion is shorter than a distance beyond which the power of an optical mode to be propagated in the waveguide is lower than approximately −60 dB.

According to an embodiment, the device further comprises a metal plate parallel to a plane orthogonal to the vias, at least partly arranged opposite the end portion and configured to absorb light originating from the end portion when a light signal propagates through the waveguide.

According to an embodiment, the device also includes a strip of a material absorbing at the wavelengths of a signal transmitted by the waveguide, the strip being parallel to a plane orthogonal to the vias, at least partly arranged opposite the end portion and being configured to absorb light originating from the end portion when a light signal propagates through the waveguide.

According to an embodiment, the device also includes metal vias along the waveguide upstream of the end portion.

According to an embodiment, the vias which border the waveguide upstream of the end portion are configured so that the effective index of an optical mode to be propagated through the waveguide varies progressively all the way to the end portion.

According to an embodiment, the end portion extends from an intermediate portion configured so that the effective index of an optical mode to be propagated in the waveguide varies progressively all the way to the end portion.

According to an embodiment, the intermediate portion includes, in a direction parallel to the longitudinal direction of the vias, a stack of a first portion and of a second portion, the second portion having a cross-section which decreases towards the end portion.

According to an embodiment, at the transition from the first portion to the end portion, the first portion and the end portion have the same transverse cross-section.

Another embodiment provides an integrated photonic circuit including a device such as defined hereabove.

According to an embodiment, the circuit includes an interconnection structure, the waveguide, preferably made of silicon nitride, being embedded in an insulating layer, preferably made of silicon oxide, of the interconnection structure.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
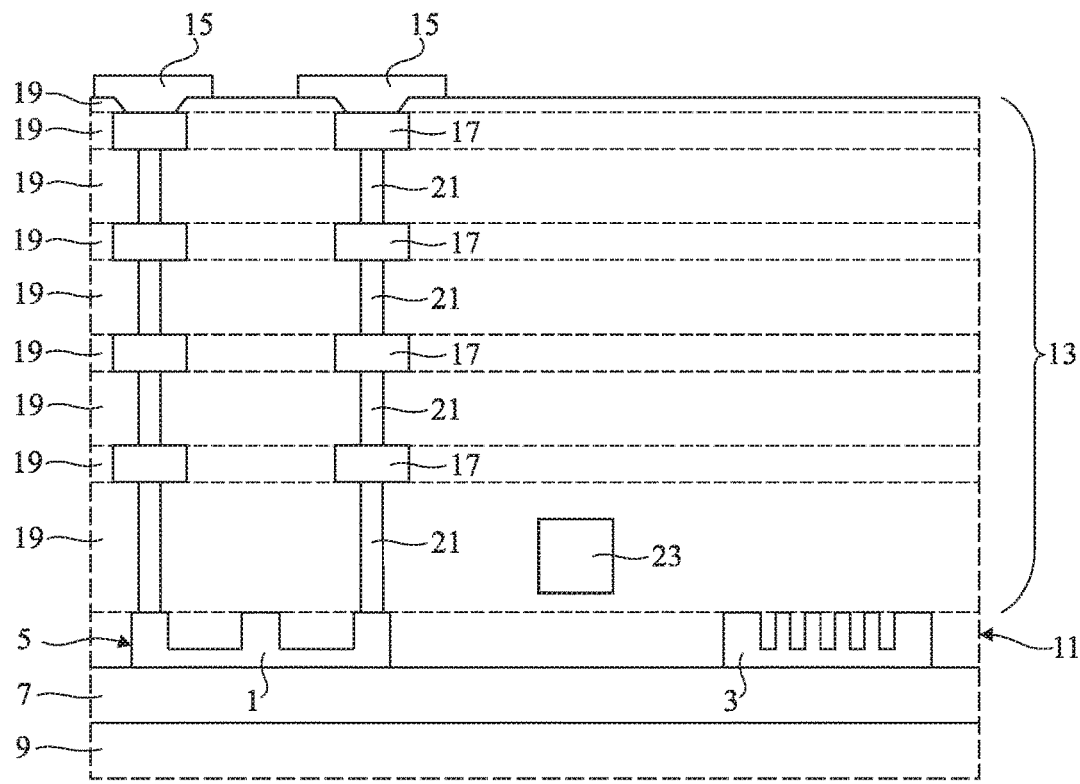
FIG. 1 is a simplified cross-section view of an integrated photonic circuit.

The same elements have been designated with the same reference numerals in the various drawings and, further, the various drawings are not to scale. For clarity, only those steps and elements which are useful to the understanding of the described embodiments have been shown and are detailed. In particular, the integrated photonic circuits where waveguide termination devices may be provided have not been described, the waveguide termination devices described hereafter being compatible with the waveguides of any suitable photonic circuits.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred to the orientation of the drawings. The terms "approximately", "about", and "in the order of" are used herein to designate a tolerance of plus or minus 10%, preferably of plus or minus 5%, of the value in question.

In the following description, when reference is made to a transverse cross-section of a waveguide, the transverse cross section is orthogonal to the longitudinal direction of the waveguide.

FIG. 1 is a partial simplified cross-section view of an integrated photonic circuit.

The integrated photonic circuit comprises various optoelectronic and/or optical elements, for example, a phase modulator 1 and a coupling network 3, formed from a semiconductor layer 5 of SOI type laid on an insulating layer 7 arranged on a support 9 such as a silicon substrate. Components 1, 3 of the circuit are arranged on insulating layer 7 and are covered with an insulating layer 11.

An interconnection structure 13 coats layer 11 to electrically couple circuit components together and/or to contact pads 15, for example, arranged at the upper surface of interconnection structure 13. Interconnection structure 13 comprises portions 17 of metal layers separated by insulating layer 19, and metal vias 21 crossing certain insulating layers 19 to electrically couple portions 17 together, to components of the integrated circuit, and/or to contact pads 15. In this example, interconnection structure 13 comprises four metallization levels, each metallization level comprising the portions 17 of a same metal layer.

In the shown example, a waveguide 23, for example, having a rectangular transverse cross-section, is arranged in layer 19 separating components 1, 3 of the photonic circuit of the lower metallization level of the interconnection structure, that is, the metallization level closest to these components.

As an example, in the following description, a waveguide comprising a rectangular transverse cross-section having a width measured between the two lateral (side) surfaces of the waveguide, and a height measured between the upper and lower surfaces of the waveguide, is considered. It is also considered as an example that the waveguide is configured to guide an optical signal having wavelength(s) which are in the near infrared range and for example in the range from 1 to 2 μm, preferably equal to approximately 1.3 μm or approximately 1.55 μm, for example 1.3 μm or 1.55 μm.

Figure 2A:
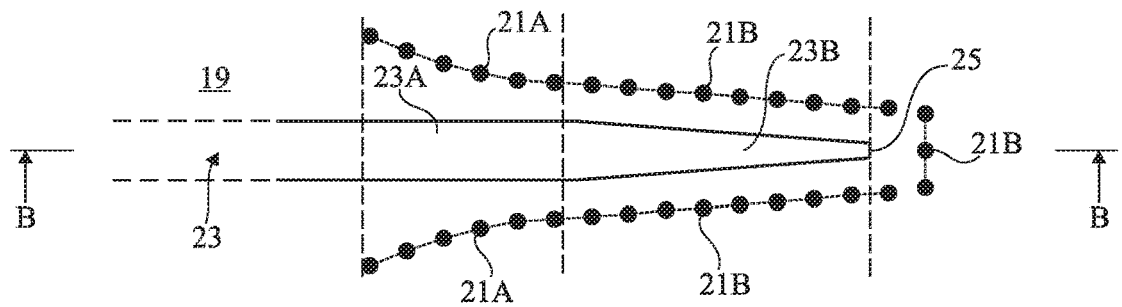
FIGS. 2A and 2B schematically show an embodiment of a waveguide termination device.
Figure 2B:
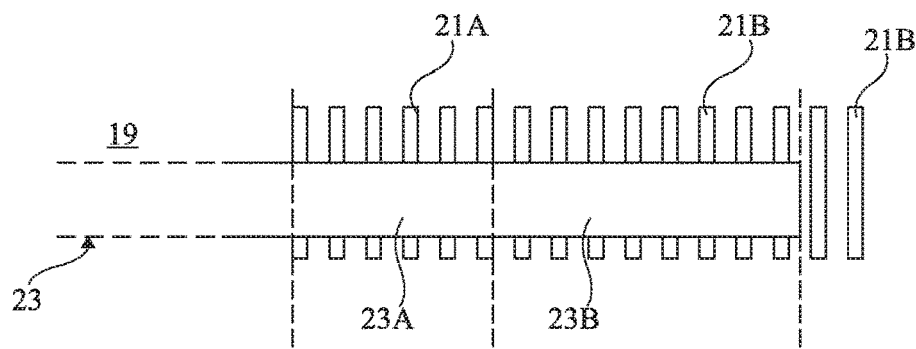

FIGS. 2A and 2B schematically show an embodiment of a termination device for waveguide 23 of FIG. 1. FIG. 2A is a top view of the device, FIG. 2B being a cross-section view along plane BB of FIG. 2A.

Waveguide 23 comprises a portion 23A having a substantially constant transverse cross-section (delimited lengthwise by the dotted lines in FIGS. 2A and 2B). The dimensions of portion 23A are selected so that a light signal propagating in portion 23A in the form of a guided optical mode remains confined therein. It is considered that an optical mode is confined in waveguide 23 when the dimensions of the waveguide, in a plane transversal to the longitudinal direction of the waveguide, are greater than those which correspond to an effectively minimum mode area, that is, to a maximum confinement. The effective area of an optical mode is defined by:

$$A_{eff} = \frac{\left[\iint_{-\infty}^{\infty} |E(x, y)|^2 dxdy\right]^2}{\iint_{-\infty}^{\infty} |E(x, y)|^4 dxdy}$$

Wherein: $A_{eff}$ is the effective area of the mode, x and y the dimensions of the waveguide in the transverse plane (here, respectively the width and the height of the waveguide), and E the distribution of the electric field of the optical mode. In this example, portion 23A has a height smaller than its width.

The waveguide comprises an end portion 23B (delimited lengthwise by the dotted lines in FIGS. 2A and 2B) extending from an end 25 of waveguide 23 to portion 23A. The transverse cross-section of portion 23B decreases all the way to end 25. In other words, at least one dimension of the transverse cross-section, in this example, the width of portion 23B, decreases all the way to end 25.

Metal vias 21B surround end portion 23B. In this example, vias 21B are arranged along a first lateral surface of portion 23B, beyond end 25, and along the other lateral surface of portion 23B. Vias 21B are for example substantially orthogonal to the plane of FIG. 2A, that is, to a plane orthogonal to vias 21B and to the transverse cross-sections of waveguide 23 in this example. Preferably, vias 21B extend lengthwise along at least the entire height of portion 23B. Preferably, in the plane orthogonal to vias 21B, a substantially constant distance separates two successive vias 21B.

Advantage is here taken from the fact that vias 21B may be identical to vias 21 (FIG. 1) between the lower metallization level of interconnection structure 13 and the components of the photonic circuit. Thus, the vias 21B of the device and vias 21 may be formed simultaneously, without providing additional manufacturing steps with respect to those already used in the manufacturing of the circuit of FIG. 1.

Metal vias 21B are arranged to at least partially absorb the light escaping from end portion 23B, in particular from the lateral surfaces of portion 23B in this example. For example, in the plane of FIG. 2A, the vias are arranged at a distance from waveguide 23 shorter than or equal to a maximum distance, for example, approximately 1.7 μm, preferably equal to 1.7 μm, beyond which it is considered that the vias no longer have an impact on the light signal. Preferably, the maximum distance is such that, beyond this maximum distance, the power of the considered optical mode is lower than approximately −60 dB.

When a light signal propagates in waveguide 23 towards end 25 thereof, due to the fact that the transverse cross-section area of end portion 23B decreases towards end 25, the signal does not remain confined in this portion. Thus, all or part of the power of the signal escapes from portion 23B in the form of light, particularly from the lateral surfaces of this portion in this example. This power is at least partially absorbed by vias 21B, which limits or even suppresses the power transmitted beyond vias 21B of the device. Further, due to the fact that, in portion 23B, the power of the signal decreases as it escapes from portion 23B, this results in a decrease, or even in a suppression, of the power reflected towards portion 23A.

Preferably, the dimensions of end portion 23B and the arrangement of vias 21B with respect to portion 23B are such that the effective index of an optical mode which propagates in waveguide 23 progressively varies from one end to another of portion 23B. The optical index of an optical mode is defined as the ratio of the propagation constant of this optical mode to the wave vector in vacuum at the considered wavelength. The progressive variation of the effective index in portion 23B enables to further decrease the reflected power.

In the embodiment shown in FIGS. 2A and 2B, the series of vias 21B continues in the form of a series of optional vias 21A arranged along and on either side of waveguide 23, beyond end portion 23B, in this example along each of the lateral surfaces of portion 23A. Vias 21A are arranged to progressively vary, all the way to portion 23B, the effective index of the optical mode propagating in waveguide 23. This enables to further decrease the reflected power when a light signal propagates in waveguide 23 towards end 25 thereof. Vias 21A are preferably identical to vias 21B and may then, as vias 21B, be formed at the same time as vias 21 of interconnection structure 13 (FIG. 1). Preferably, in the plane of FIG. 2A, the distance between two successive vias 21A is substantially constant, for example, approximately equal to that between two successive vias 21B. As an example, in the plane of FIG. 2A and as the distance from end 25 of waveguide 23 increases, vias 21A become more distant from waveguide 23, for example, by following the contours of a circular function, which results in a progressive variation, along portion 23A, of the effective index of the optical mode propagating through the waveguide.

The dimensions of end portion 23B and the arrangement of vias 21B with respect to portion 23B, as well as the length of portion 23A bordered by vias 21A and the arrangement of vias 21A with respect to portion 23A may be determined by those skilled in the art based on the functional indications given hereabove. For this purpose, those skilled in the art may use simulations tools, for example, simulation tools using finite difference time domain calculations (FDTD). An example of such a simulation tool is provided by the company called "Lumerical".

Figure 3A:
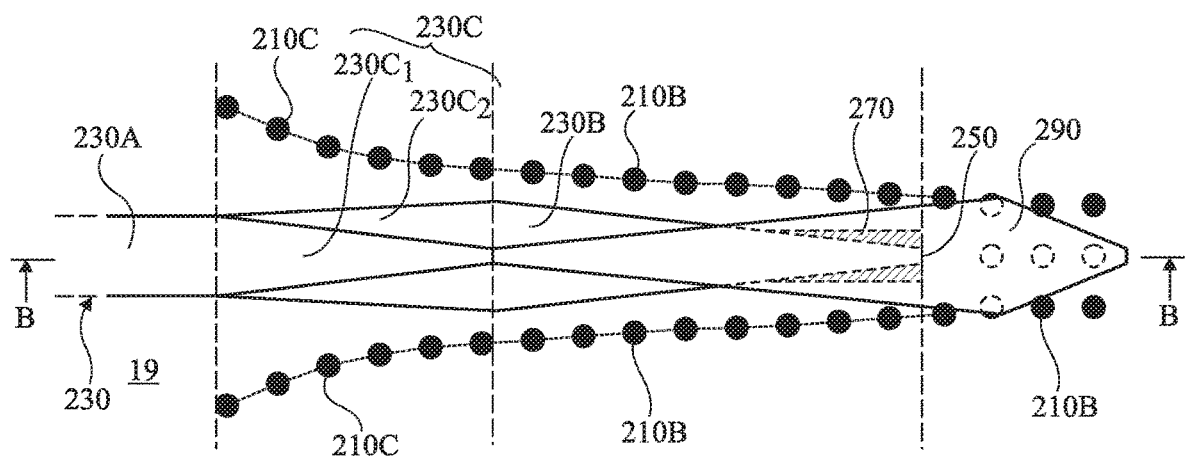
FIGS. 3A and 3B schematically show an alternative embodiment of the device of FIGS. 2A and 2B.
Figure 3B:
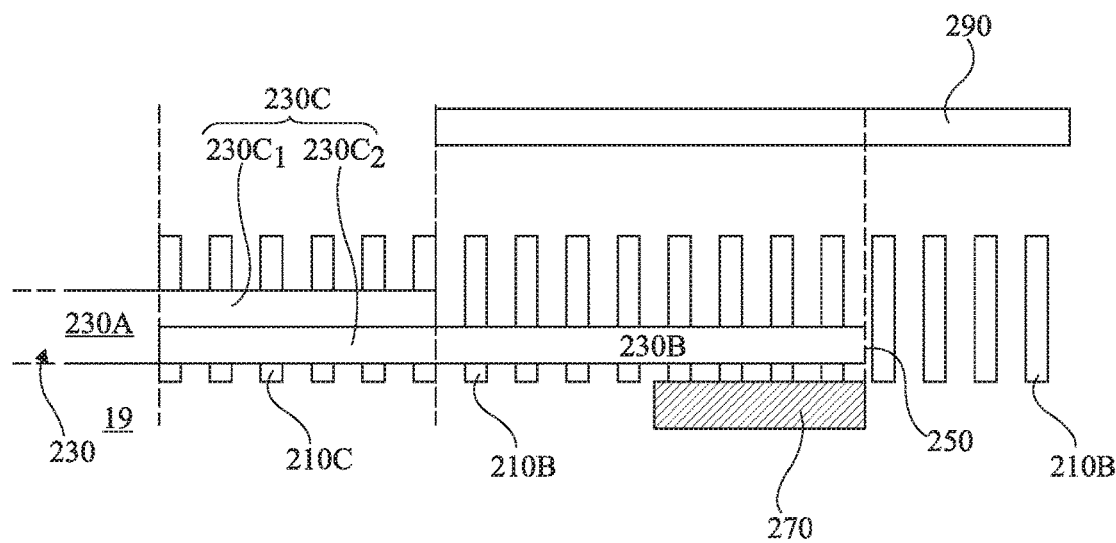

FIGS. 3A and 3B schematically show an alternative embodiment of the device of FIGS. 2A and 2B, FIG. 3A being a top view and FIG. 3B being a cross-section view along plane BB of FIG. 3A.

The waveguide of FIGS. 3A and 3B, here bearing reference 230 and corresponding to waveguide 23 of FIG. 1, comprises a portion 230A having a constant transverse cross section, for example, identical to portion 23A of FIGS. 2A and 2B, an end portion 230B having a transverse cross-section which decreases all the way to an end 250 of the waveguide, and an intermediate portion 230C from portion 230A to portion 230B.

As in FIGS. 2A and 2B, in this example, the width of end portion 230B decreases all the way to end 250. Unlike end portion 23B of FIGS. 2A and 2B, the height of end portion 230B is here smaller than that of portions 230A and 230C, the latter here having an identical height.

As in FIGS. 2A and 2B, vias 210B surround portion 230B to absorb light escaping from portion 230B when a light signal propagates therein. Vias 210B are identical to the vias 21B described in relation with FIGS. 2A-2B, with the difference that they are here substantially orthogonal to the plane of FIG. 3A, that is, to a plane orthogonal to vias 210B and to the transverse cross-sections of waveguide 230 in this example. Further, in this example, beyond end 250, vias 210B are distributed in a plurality, here, three, of alignments parallel to one another and orthogonal to the longitudinal direction of waveguide 230.

A strip 270 made of a material absorbing light at the considered wavelengths, for example, germanium, doped silicon, or a silicide, is arranged at least partly opposite end portion 230B, in this example under end portion 230B. Strip 270 is here parallel to the plane of FIG. 3A. Strip 270 extends lengthwise parallel to the longitudinal direction of portion 230B, along all or part of the length of portion 230B, preferably from end 250. As an example, the length of strip 270 is equal to approximately two thirds of that of portion 230B.

Advantage is here taken from the fact that strip 270 may be formed from semiconductor layer 5 (FIG. 1) already present under the waveguide. For example, a germanium strip 270 may be formed by epitaxy from layer 5. A doped silicon strip 270 may for example be formed by doping a portion of layer 5 when the latter is made of silicon. A silicide strip 270 may for example be formed by siliciding a portion of layer 5. Thus, strip 270 may be formed by providing a few additional steps, or even no additional step, as compared with those already used in the manufacturing of the circuit of FIG. 1.

Strip 270 is arranged relative to portion 230B so that, when a light signal propagates in waveguide 230 towards end 250 thereof, all or part of the light escaping from portion 230B, particularly from the lower surface of portion 230B in this example, is absorbed by strip 270.

A metal plate 290 absorbing light at the considered wavelengths is at least partly arranged opposite end portion 230B, in this example above end portion 230B. Plate 290 is here parallel to the plane of FIG. 3A. Plate 290 extends lengthwise parallel to the longitudinal direction of portion 230B, along all or part of the length of portion 230B. As an example, plate 290 extends lengthwise from the end of portion 230B opposite to end 250 to beyond vias 210B.

Advantage is here taken from the fact that plate 290 may be a portion 17 of metal layer of one of the metallization levels of structure 13 (FIG. 1), for example, of one of the two metallization levels closest to components 1, 3 of the photonic circuit, preferably the second metallization level closest to these components. Plate 290 can thus be formed by providing no additional step with respect to those already used in the manufacturing of the circuit of FIG. 1.

Plate 290 is arranged with respect to portion 230B so that, when a light signal propagates in waveguide 230 to end 250 thereof, all or part of the light escaping from portion 230B, particularly from the upper surface of portion 230B in this example, is absorbed by plate 290.

In the shown embodiment, the series of vias 210B continues in the form of a series of optional vias 210C arranged along and on either side of intermediate portion 230C, in this example, along each of the lateral surfaces of this portion. Vias 210C are preferably identical to vias 210B and may then, like vias 210B, be formed at the same time as vias 21 of interconnection structure 13 (FIG. 1). In this embodiment, in the plane of FIG. 3A, vias 210C become more distant from portion 23C0 as the distance from end 250 increases, for example, by following the contours of a circular function.

Intermediate portion 230C and, possibly, the vias 210C bordering it, are configured, like the vias 21A of FIGS. 2A and 2B, to progressively vary, all the way to portion 230B, the effective index of the optical mode propagating within waveguide 230. This enables decreasing of the power reflected towards portion 230A when a signal propagates in waveguide 230, towards end 250.

In this embodiment, portion 230C comprises, in a direction parallel to vias 210B, 210C, a stack of two portions $230C_1$ and $230C_2$, portion $230C_1$ resting on portion $230C_2$. Portions $230C_1$ and $230C_2$ are configured so that the optical signal confined in portion 230A progressively passes into portion 230B. Thus, at the transition from portion 230A to portion 230C, portion 230A and the stack of portions $230C_1$ and $230C_2$ have the same transverse cross-section and, at the transition from portion 230C to portion 230B, portions 230B and $230C_2$ have the same transverse cross section area. The width of portion $230C_1$ progressively decreases from portion 230A to portion 230B. In this example, the width of portion $230C_2$ progressively increases from portion 230A to portion 230B.

In the device of FIGS. 3A and 3B, when a light signal propagates in end portion 230B, all or part of the power of the signal escapes from portion 230B in the form of light. In particular, in this embodiment, this power escapes from the lateral surfaces of portion 230B and, due to the fact that the height of portion 230B is smaller than that of portion 230A, from the upper and lower surfaces of portion 230B. The power which escapes from portion 230B is then at least partially absorbed by vias 210B, strip 270, and plate 290, which limits or even suppresses the power transmitted beyond the device. Similarly to what has been described in relation with FIGS. 2A and 2B, the decrease of the power of the signal propagating in portion 230B causes a decrease or even a suppression of the power reflected towards portion 230A.

Preferably, the dimensions of end portion 230B, of strip 270, and of plate 290, as well as the arrangement of vias 210B, of strip 270, and of plate 290 relative to portion 230B are selected so that the effective index of the optical mode propagating within waveguide 230 progressively varies from one end to the other of portion 230B. This enables to further decrease the power reflected towards portion 230A. As an example, to obtain such an effective optical index variation, the width of plate 290 may increase from its ends, plate 290 for example having a maximum width beyond end 250, for example, above the alignment of vias 210B closest to end 250. Further, portion 230B may have a transverse cross-section area, in this example the width of the transverse cross-section, which decreases less rapidly in a portion arranged on the side of end 250 than in a portion arranged on the side of portion 230A.

As for the embodiment of FIGS. 2A and 2B, it is within the abilities of those skilled in the art to determine the dimensions and the relative arrangement of the elements of the waveguide termination device of FIGS. 3A and 3B, based on the functional indications given hereabove.

A transverse electric optical mode is here defined such that its electric field oscillates in a plane parallel to the plane shown in FIGS. 2A and 3A, in other words parallel to the upper surface of substrate 9 (FIG. 1), and perpendicularly to the signal propagation direction in the waveguide. A transverse electric optical mode is here defined such that its electric field oscillates in a plane parallel to the plane shown in FIGS. 2A and 3A, in other words parallel to the upper surface of substrate 9 (FIG. 1), and perpendicularly to the signal propagation direction in the waveguide. The embodiment described in relation with FIGS. 2A and 2B is particularly adapted to the case where the light signal propagating through waveguide 23 is in the form of a transverse electric optical mode. The embodiment described in relation with FIGS. 3A and 3B is particularly adapted to the case where the light signal propagating in waveguide 230 is in the form of a transverse electric optical and/or transverse magnetic mode. Indeed, in the embodiment of FIGS. 3A and 3B, the height decrease of waveguide 230 eases the deconfinement of the transverse magnetic mode and thus the absorption thereof by strip 270 and/or plate 290. The power reflected towards portion 230A is also minimized.

As an example, waveguide 23 or 230 is made of silicon nitride, the layer 19 having the waveguide embedded therein being for example made of silicon oxide. An advantage of such a waveguide is that it is less sensitive to manufacturing and temperature variations, this guide being for example particularly well adapted to the forming of optical multiplexers and/or demultiplexers.

As a specific embodiment, a silicon nitride waveguide 23 or 230 embedded in a silicon oxide layer 19 is provided, with the following dimensions:
  width of portion 23A or 230A in the range from 180 nm to 5 µm, preferably equal to approximately 700 nm, for example, to 700 nm;
  height of portion 23A or 230A in the range from 200 nm to 2 µm, preferably equal to approximately 600 nm, for example, to 600 nm;
  width of end 25 or 250 smaller than or equal to 1 µm, preferably equal to approximately 180 nm, for example, to 180 nm;
  length of portion 23B in the range from 1 to 200 µm, preferably equal to approximately 25 µm, for example, to 25 µm;
  length of portion 230B in the range from 1 to 200 µm, preferably approximately equal to 40 µm, for example, equal to 40 µm;
  length of portion 230C in the range from 1 to 200 µm, preferably equal to approximately 20 µm, for example, equal to 20 µm;
  maximum width of portion $230C_1$ in the range from 80 nm to 5 µm, preferably equal to approximately 1.2 µm, for example, equal to 1.2 µm;
  minimum width of portion $230C_2$ equal to the maximum width of portion 230A;
  height of portion $230C_1$ in the range from 200 nm to 2 µm, preferably equal to approximately 600 nm, for example, equal to 600 nm;
  height of portion $230C_2$ in the range from 50 nm to 2 µm, preferably equal to approximately 350 nm, for example, equal to 350 nm;
  in a plane orthogonal to the vias, distance between two successive vias 21A and/or 21B or between two successive vias 210B and/or 210C in the range from 100 nm to 5 µm, preferably approximately equal to 360 nm, for example, equal to 360 nm; and
  in a plane orthogonal to the vias, distance between each via 21A, 21B, 210B, 210C and the waveguide in the range from 100 nm to 5 µm, preferably equal to approximately 500 nm (for example, equal to 500 nm) between vias 21B or 210B and portion 23B or 230B, respectively, and for example up to approximately 1.7 µm (for example, up to 1.7 µm) between vias 21A, 210C, and the waveguide.

Such a termination device is adapted to wavelengths in the near infrared range, for example, in the range from 1 to 2 µm, preferably equal to approximately 1.3 µm or approximately 1.55 µm, for example, to 1.3 µm or 1.55 µm.

Simulations have shown that, when a signal having wavelengths in near infrared, polarized according to a transverse electric mode, propagates through the waveguide of FIGS. 2A-2B having the dimensions indicated hereabove, less than $10^{-3}$% of the power of the signal is reflected toward portion 23A, and less than 1% of the power of the signal is reflected beyond vias 21A and 21B.

Other simulations have shown that, when a signal having wavelengths in near infrared, polarized according to a transverse electric and/or transverse magnetic mode, propagates through the waveguide of FIGS. 3A-3B having the dimensions indicated hereabove, less than $10^{-3}$% of the power of the signal is reflected, and less than $10^{-3}$% of the power of the signal is reflected beyond vias 210B and 210C, strip 270 and plate 290.

Specific embodiments have been described. Various alterations, modifications, and improvements will occur to those skilled in the art. In particular, although a waveguide termination device comprising a strip 270 and a plate 290 has been described in relation with FIGS. 3A and 3B, it is possible for the device to comprise strip 270 or plate 290 only.

Strip 270 may be made of another material than those indicated hereabove as an example, provided that this material absorbs light at the considered wavelengths.

Vias 21A, 21B, 210B and/or 210C, strip 270 and/or plate 290 may be electrically connected to a potential, typically, the ground, or be left floating.

The plurality of alignments of vias 210B arranged beyond end 250 of waveguide 230, strip 270, and/or plate 290 described in relation with FIGS. 3A-3B may be provided in the embodiment described in relation with FIGS. 2A-2B.

The embodiments described hereabove are not limited to the case of a waveguide such as illustrated in FIG. 1, and the waveguide may be formed in another insulating layer of the interconnection structure. More generally, it will be within the abilities of those skilled in the art to apply these embodiments to other waveguides of a photonic integrated circuit, particularly to waveguides made of other materials than those indicated hereabove as an example. For example, these embodiments apply to a waveguide made of amorphous silicon embedded in silicon oxide, silicon nitride, or silicon oxynitride (SiON), aluminum nitride (AlN), silicon carbonitride (SiCN), or also doped silicon oxides.

Further, the described embodiments may be adapted for signals having wavelengths different than those indicated hereabove as an example, for example, at wavelengths compatible with a conventional photonic circuit, for example, in the range from approximately 400 nm to approximately 5 µm, for example from 400 nm to 5 µm, it being within the abilities of those skilled in the art to adapt the dimensions of the waveguide and the position of the vias, of the plate, and/or of the strip relative to the waveguide according to the considered wavelength.

Various embodiments with different variations have been described hereabove. It should be noted that those skilled in the art may combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. An optical waveguide termination device, comprising:
   an optical waveguide; and
   a plurality of metal vias positioned to surround an end portion of the optical waveguide.

2. The optical waveguide termination device of claim 1, wherein the end portion has a transverse cross-sectional area which decreases towards a distal end of the end portion.

3. The optical waveguide termination device of claim 2, wherein the plurality of metal vias extend orthogonal to a same plane, said same plane being orthogonal to said transverse cross-section.

4. The optical waveguide termination device of claim 1, wherein the plurality of metal vias are configured to absorb light originating from the end portion in response to a light signal propagating through the optical waveguide.

5. The optical waveguide termination device of claim 4, wherein the plurality of metal vias and the end portion are configured so that an effective index of an optical mode to be propagated through the waveguide progressively varies in the end portion.

6. The optical waveguide termination device of claim 1, wherein, in a plane orthogonal to the metal vias, a distance between the metal vias and the end portion is shorter than a distance beyond which power of an optical mode to be propagated in the waveguide is lower than approximately −60 dB.

7. The optical waveguide termination device of claim 1, further comprising a metal plate parallel to a plane orthogonal to the metal vias, at least partly arranged opposite the end portion and configured to absorb light originating from the end portion in response to a light signal propagating through the optical waveguide.

8. The optical waveguide termination device of claim 1, further comprising a strip of a material absorbing at wavelengths of a light signal propagating through the optical waveguide, said strip being parallel to a plane orthogonal to the metal vias, at least partly arranged opposite the end portion and being configured to absorb light originating from the end portion in response to the light signal propagating through the optical waveguide.

9. The optical waveguide termination device of claim 1, also comprising additional metal vias along the waveguide upstream of the end portion.

10. The optical waveguide termination device of claim 9, wherein the additional metal vias border the waveguide upstream of the end portion and are configured so that an effective index of an optical mode to be propagated through the waveguide varies progressively toward the end portion.

11. The optical waveguide termination device of claim 1, wherein the end portion extends from an intermediate portion configured so that an effective index of an optical mode to be propagated through the waveguide varies progressively toward to the end portion.

12. The optical waveguide termination device of claim 11, wherein the intermediate portion comprises, in a direction parallel to a longitudinal direction of the metal vias, a stack of a first portion and of a second portion, the second portion having a cross-section area that decreases toward the end portion.

13. The optical waveguide termination device of claim 12, wherein, at a transition from the first portion to the end portion, the first portion and the end portion have a same transverse cross section area.

14. The optical waveguide termination device of claim 1, further comprising an interconnection structure, wherein the optical waveguide is formed from silicon nitride and is embedded in an insulating layer formed from silicon oxide.

15. The optical waveguide termination device of claim 1, wherein at least some of the plurality of metal vias extend across a longitudinal axis of the end portion of the optical waveguide.

16. The optical waveguide termination device of claim 1, wherein the end portion is defined by opposed sides which terminate at a distal end, and wherein the surrounding plurality of metal vias are positioned offset from and along the opposed sides and offset from and at the distal end.

17. An optical waveguide termination device, comprising:
   a waveguide in which an optical signal propagates; and
   metal vias surrounding an end portion of the waveguide;
   wherein the end portion of the waveguide has a transverse cross-sectional area decreasing towards its distal end;
   wherein the metal vias are orthogonal to a same plane, said same plane being orthogonal to said transverse cross-section; and wherein the metal vias are configured to absorb light originating from the end portion when the optical signal propagates through the waveguide, and wherein the metal vias and the end portion are configured so that an effective index of an optical mode to be propagated through the waveguide progressively varies in the end portion.

18. The optical waveguide termination device of claim 17, further comprising additional metal vias along the waveguide upstream of the end portion, wherein the additional metal vias which border the waveguide upstream of the end portion are configured so that the effective index of an optical mode to be propagated through the waveguide varies progressively toward the end portion.

19. The optical waveguide termination device of claim 17, wherein the end portion extends from an intermediate portion configured so that the effective index of an optical mode to be propagated through the waveguide varies progressively toward to the end portion.

20. The optical waveguide termination device of claim 19, wherein the intermediate portion comprises, in a direction parallel to a longitudinal direction of the metal vias, a stack of a first portion and of a second portion, the second portion having a cross-section area which decreases toward the end portion, wherein, at a transition from the first portion to the end portion, the first portion and the end portion have a same transverse cross section area.

21. An optical waveguide termination device, comprising:
an optical waveguide configured to support propagation of light therethrough towards an end portion of the optical waveguide;
an insulating layer laterally surrounding the optical waveguide, said insulating layer having a thickness which is thicker than a thickness of the optical waveguide; and
a plurality of metal vias located in the insulating layer and positioned to surround the end portion of the optical waveguide, where each metal via of said plurality of metal vias extends through the thickness of the insulating layer.

22. The optical waveguide termination device of claim 21, wherein the end portion has a transverse cross-sectional area which decreases towards a distal end of the end portion.

23. The optical waveguide termination device of claim 21, wherein the plurality of metal vias are configured to absorb light originating from the end portion.

24. The optical waveguide termination device of claim 23, further comprising a metal plate extending parallel to a plane orthogonal to the thickness of the insulating layer, said metal plate located at said end portion and configured to absorb light originating from the end portion.

25. The optical waveguide termination device of claim 23, further comprising a strip of a material extending parallel to a plane orthogonal to the thickness of the insulating layer, said strip located at said end portion and configured to absorb light originating from the end portion.

* * * * *